(12) United States Patent
Tai

(10) Patent No.: US 6,477,314 B1
(45) Date of Patent: Nov. 5, 2002

(54) METHOD OF RECORDING IMAGE DATA, AND COMPUTER SYSTEM CAPABLE OF RECORDING IMAGE DATA

(75) Inventor: Kuang-cheng Tai, Taipei Hsien (TW)

(73) Assignee: GEO Vision Inc., Taipei (TW)

( * ) Notice: Subject to any disclaimer, the term of this patent is extended or adjusted under 35 U.S.C. 154(b) by 0 days.

(21) Appl. No.: 09/363,170

(22) Filed: Jul. 29, 1999

(51) Int. Cl.⁷ .............................. H04N 5/93
(52) U.S. Cl. .................. 386/52; 348/552; 345/634
(58) Field of Search .................. 386/4, 46, 52, 386/117, 125–126; 348/231–233, 159, 218, 552; 345/634, 723

(56) References Cited

U.S. PATENT DOCUMENTS 5,664,087 A * 9/1997 Tani et al. ................. 345/723
5,686,960 A * 11/1997 Sussman et al. ........... 348/218
5,689,303 A * 11/1997 Kuroiwa .................... 386/117

* cited by examiner

*Primary Examiner*—Thai Tran
*Assistant Examiner*—Christopher Onuaku
(74) *Attorney, Agent, or Firm*—Finnegan, Henderson, Farabow, Garrett & Dunner, L.L.P.

(57) ABSTRACT

A method of recording image data includes the steps of:
(a) storing image frame data in a video buffer that is accessed by a computer monitor, the computer monitor showing an image corresponding to the image frame data;
(b) selecting a region of the image shown on the computer monitor;
(c) retrieving from the video buffer a segment of the image frame data corresponding to the selected region of the image shown on the computer monitor; and
(d) storing the segment of the image frame data retrieved from the video buffer as a corresponding file in a data storage device.

16 Claims, 5 Drawing Sheets

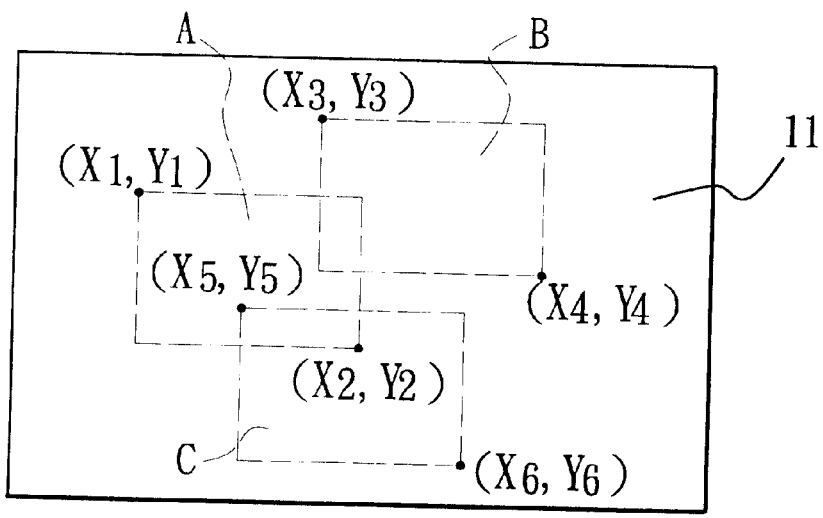
F I G. 5
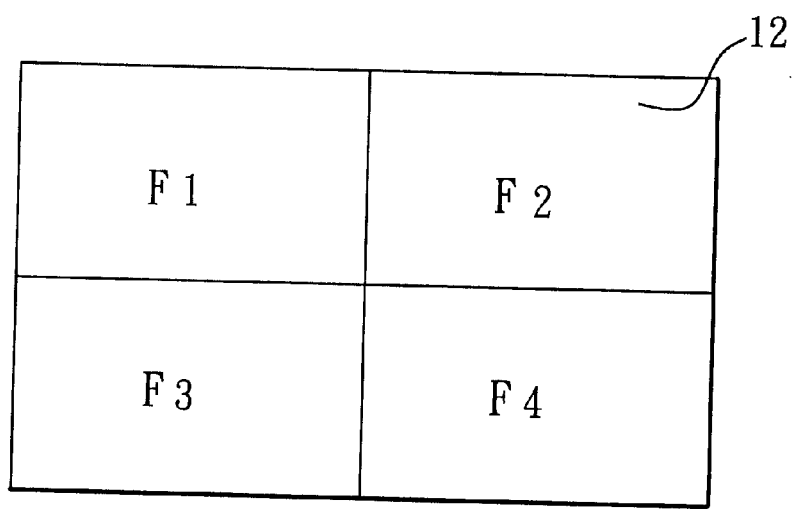
F I G. 6

METHOD OF RECORDING IMAGE DATA, AND COMPUTER SYSTEM CAPABLE OF RECORDING IMAGE DATA

BACKGROUND OF THE INVENTION

1. Field of the Invention

The invention relates to a method of recording image data, more particularly to a method of recording image data which corresponds to a desired region of an image shown on a computer monitor.

2. Description of the Related Art

A conventional computer system includes an image combining device for receiving and combining image frames outputted by a plurality of video sources, such as four to eight cameras, to generate composite image frames in an analog format, a video capture card connected to the image combining device for receiving the composite image frames and for transforming the composite image frames into a digital format to generate image frame data, a video buffer connected to the video capture card for storing the image frame data therein, and a computer monitor connected to the video buffer to access the image frame data and to show an image corresponding to the image frame data.

The drawback of the aforesaid conventional computer system is that a segment of the image frame data cannot be recorded as a single file corresponding to a selected region of the image shown on the computer monitor.

SUMMARY OF THE INVENTION

Therefore, the object of the present invention is to provide a method of recording image data and a computer system capable of recording image data which can overcome the abovementioned drawback associated with the aforesaid prior art.

According to one aspect of the present invention, a method of recording image data comprises:

(a) storing image frame data in a video buffer that is accessed by a computer monitor, the computer monitor showing an image corresponding to the image frame data;

(b) selecting a region of the image shown on the computer monitor;

(c) retrieving from the video buffer a segment of the image frame data corresponding to the selected region of the image shown on the computer monitor; and (d) storing the segment of the image frame data retrieved from the video buffer as a corresponding file in a data storage device.

According to another aspect of the present invention, a computer system includes a data storage device, a video buffer, a computer monitor connected to the video buffer, and a processing unit connected to the data storage device and the video buffer. The video buffer is adapted for storing image frame data therein. The computer monitor accesses the image frame data stored in the video buffer, and shows an image corresponding to the image frame data. The processing unit includes selecting means for selecting a region of the image shown on the computer monitor, retrieving means for retrieving from the video buffer a segment of the image frame data corresponding to the selected region of the image shown on the computer monitor, and recording means for storing the segment of the image frame data retrieved from the video buffer as a corresponding file in the data storage device.

BRIEF DESCRIPTION OF THE DRAWINGS

Other features and advantages of the present invention will become apparent in the following detailed description of the preferred embodiment with reference to the accompanying drawings, of which:

FIG. 5 illustrates three regions selected manually on a computer monitor; and

FIG. 6 illustrates the video buffer partitioned automatically into four equally sized adjoining parts.

DETAILED DESCRIPTION OF THE PREFERRED EMBODIMENT

Figure 1:
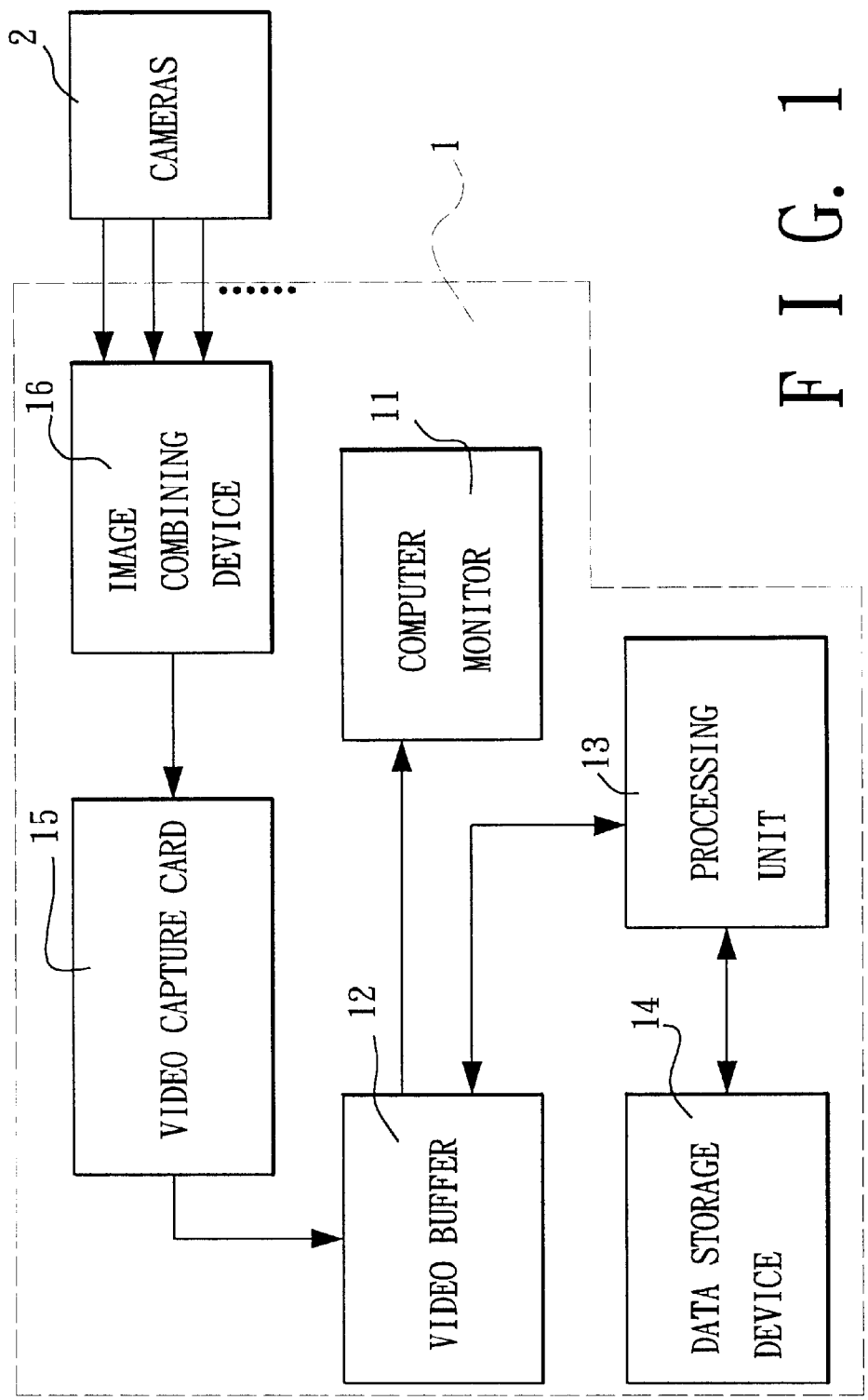
FIG. 1 is a schematic circuit block diagram illustrating the preferred embodiment of a computer system according to this invention.
Figure 2:
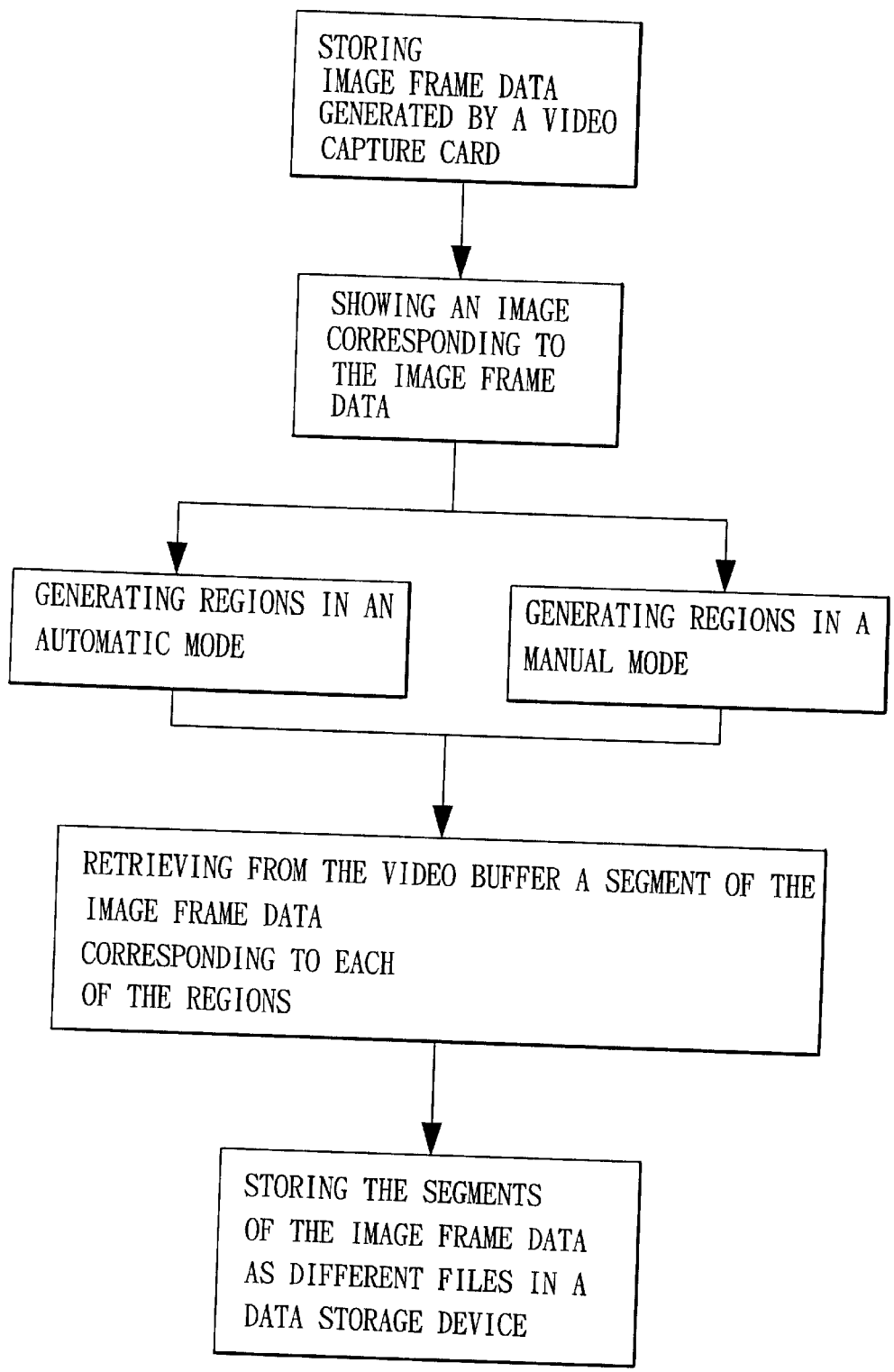
FIG. 2 is a flow chart of an image data recording method conducted by the preferred embodiment.
Figure 3:
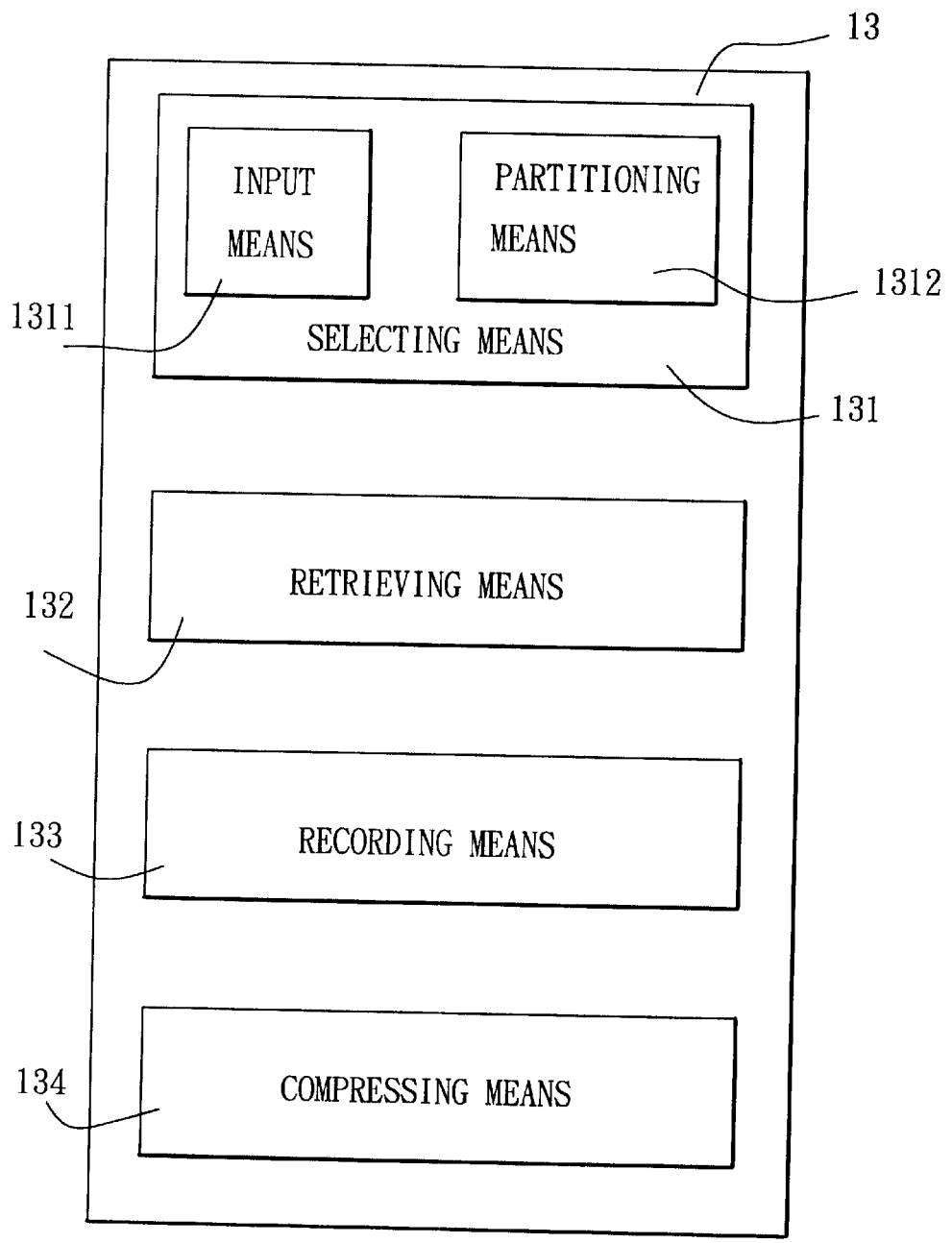
FIG. 3 is a functional block diagram of a processing unit of the computer system.

Referring to FIGS. 1 to 3, according to the preferred embodiment, a computer system 1 is shown to include a data storage device 14, a video buffer 12, a computer monitor 11 connected to the video buffer 12, a processing unit 13 connected to the data storage device 14 and the video buffer 12, a video capture device, such as a video capture card 15, connected to the video buffer 12, and an image combining device 16 connected to the video capture card 15.

The image combining device 16 is adapted to interconnect the video capture card 15 and a plurality of cameras 2. The image combining device 16 is adapted to receive and combine image frames outputted by the cameras 2 so as to generate composite image frames in an analog format.

The video capture card 15 receives the composite image frames from the image combining device 16, and transforms the composite image frames into a digital format to generate image frame data.

The video buffer 12 stores the image frame data from the video capture card 15 therein.

Figure 4:
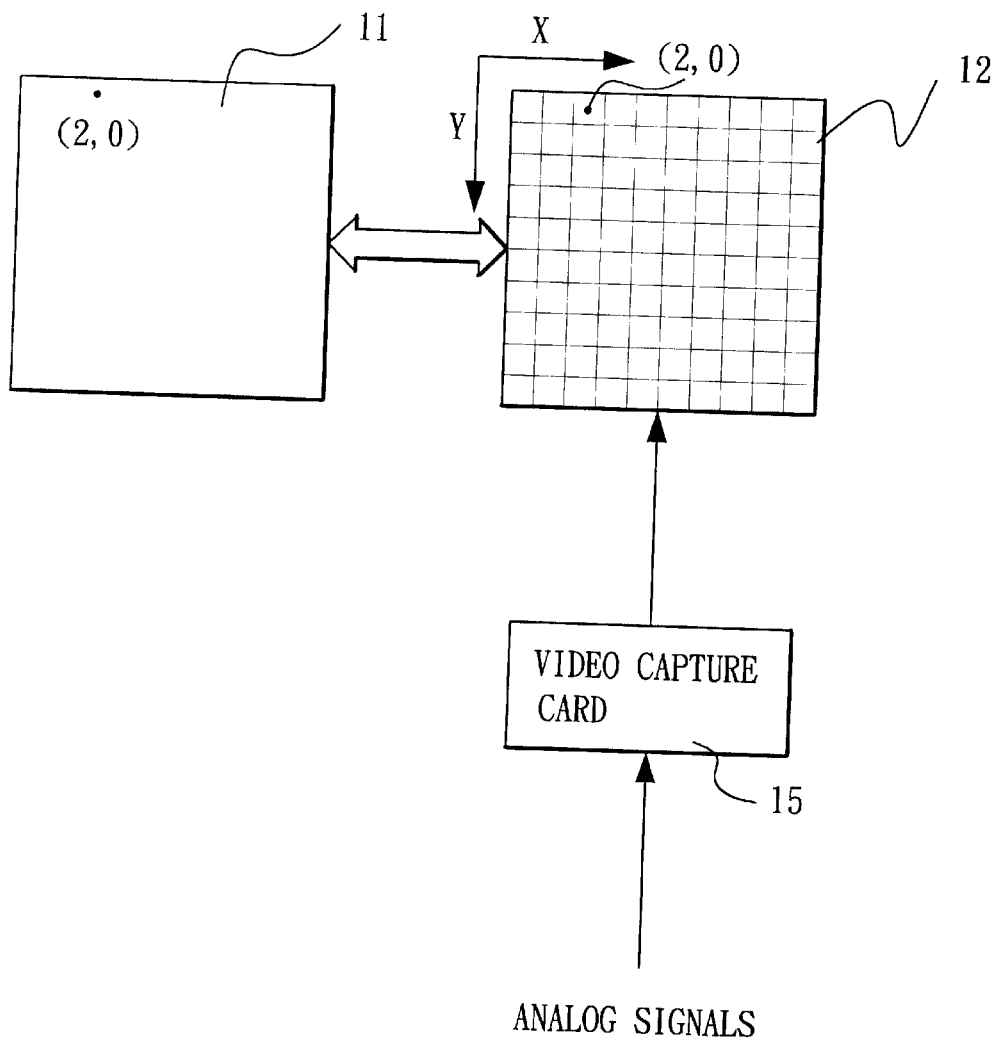
FIG. 4 illustrates the functional relationship among a computer monitor, a video buffer, and a video capture card.

The computer monitor 11 accesses the image frame data stored in the video buffer 12, and shows an image corresponding to the image frame data. For example, as shown in FIG. 4, analog signals for a pixel of the computer monitor 11 at a coordinate (2,0) are transformed into digital signals via the video capture card 15 to generate image frame data in a one-bit (black and white) or eight-bit (256 colors) format that are subsequently stored in the video buffer 12 at a coordinate (2,0) of the latter.

The processing unit 13 includes selecting means 131, retrieving means 132, recording means 133 and compressing means 134. The selecting means 131 is operable in one of a manual mode and an automatic mode, and includes input means 1311 and partitioning means 1312. In the manual mode, for example, as shown in FIG. 5, the input means 1311, such as a keyboard or a mouse, is used to input a first upper-left corner coordinate (X1, Y1) and a first lower-right corner coordinate (X2, Y2) so as to select a first rectangular region (A) of the image shown on the computer monitor 11. In the same, the input means 1311 can be used to select a second rectangular region (B) of the image by inputting a second upper-left corner coordinate (X3, Y3) and a second lower-right corner coordinate (X4, Y4), and a third rectangular region (C) of the image by inputting a second upper-left corner coordinate (X5, Y5) and a second lower-right corner coordinate (X6, Y6). Each of the first, second and third regions (A, B, C) can overlap with each other. In the automatic mode, for example, the input means 1311 is used to input a desired number of regions, such as "four". Thereafter, the partitioning means 1312 automatically partitions the video buffer 12 into four equally sized adjoining parts (F1, F2, F3, F4), as shown in FIG. 6. The retrieving means 132 retrieves from the video buffer 12 a segment of the image frame data corresponding to each of the selected regions of the image shown on the computer monitor 11. The compressing means 134 compresses each. of the segments of the image frame data retrieved from the video buffer 12 using known video compression algorithms. The recording means 133 stores the compressed segments of the image frame data retrieved from the video buffer 12 as different files in the data storage device 14.

The files in the data storage device 14 can be selected for image reproduction on the computer monitor 11. As is known in the art of image displays, the image frame data of the selected file is retrieved from the data storage device 14 for storage in the video buffer 12, which is accessed by the computer monitor 11 for showing a corresponding image thereon.

Therefore, with the use of the present invention, it is possible to record image frame data of a selected region of an image shown on a computer monitor to overcome the aforesaid drawback of the conventional computer system.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method of recording image data, comprising the steps of:
   (a) storing image frame data in a video buffer that is accessed by a computer monitor, the computer monitor showing an image corresponding to the image frame data;
   (b) selecting a region of the image shown on the computer monitor;
   (c) retrieving from the video buffer a segment of the image frame data corresponding to the selected region of the image shown on the computer monitor; and
   (d) storing the segment of the image frame data retrieved from the video buffer as a corresponding file in a data storage device.

2. The method of claim 1, wherein, instep (a), the image frame data stored in the video buffer is generated by a video capture device.

3. The method of claim 2, wherein the video capture device receives image frame in an analog format from a camera, and transforms the image frame into a digital format to generate the image frame data.

4. The method of claim 2, wherein the video capture device receives composite image frames in an analog format from a image combining device, the image combining device generating the composite image frames by combining image frames outputted from at least two cameras, the video capture device transforming the composite image frames into a digital format to generate the image frame data.

5. The method of claim 1, wherein the selected region of the image is a rectangular, and step (b) includes:
   inputting coordinates of two diagonally opposite corners that define the selected region of the image.

6. The method of claim 1, wherein:
   at least two region of the image are selected in step (b), the segments of the image frame data corresponding to the selected regions of the image are retrieved from the video buffer in step (c), and the segments of the image frame data retrieved from the video buffer are stored as different files in the data storage device in step (d).

7. The method of claim 6, wherein step (b) includes:
   inputting a desired number of the regions; and
   automatically partitioning the video buffer into a number of equally sized adjoining parts that are equal in number to the desired number of the regions, each of the adjoining parts storing the segment of the image frame data corresponding to a respective one of the selected regions of the image.

8. The method of claim 1, further comprising the step of compressing the segment of the image frame data retrieved from the video buffer prior to storage in the data storage device.

9. A computer system capable of recording image data, comprising:
   a data storage device;
   a video buffer adapted for storing image frame data therein;
   a computer monitor connected to said video buffer, said computer monitor accessing the image frame data stored in said video buffer and showing an image corresponding to the image frame data; and
   a processing unit connected to said data storage device and said video buffer, said processing unit including
      selecting means for selecting a region of the image shown on said computer monitor,
      retrieving means for retrieving from said video buffer a segment of the image frame data corresponding to the selected region of the image shown on said computer monitor, and
      recording means for storing the segment of the image frame data retrieved from said video buffer as a corresponding file in said data storage device.

10. The computer system of claim 9, further comprising a video capture device conned to said video buffer and generating the image frame data stored in said video buffer.

11. The computer system of claim 10, wherein said video capture device is adapted to receive image frames in an analog format from a camera, and is adapted to transform the image frames into a digital format to generate the image frame data.

12. The computer system of claim 10, further comprising an image combining device adapted to interconnect said video capture device and at least two cameras, said image combining device being adapted to receive and combine image frames outputted by the cameras so as to generate composite image frames in an analog format, said video capture device receiving the composite image frames from said image combining device and transforming the composite image frames into a digital format to generate the image frame data.

13. The computer system of claim 9, wherein the selected region of the image is rectangular, and said selecting means comprises coordinate input means for inputting coordinates of two diagonally opposite corners that define the selected region of the image.

14. The computer system of claim 9, wherein:

said selecting means is operable so as to select at least two regions of the image, said retrieving means retrieves the segments of the image frame data corresponding to the selected regions of the image from said video buffer, and said recording means stores the segments of the image frame data retrieved from said video buffer as different files in said data storage device.

15. The computer system of claim 14, wherein said selecting means includes:

input means for inputting a desired number of regions; and partitionig means for automatically partitioning said video buffer into a number of equally sized adjoining parts that are equal in number to the desired number of regions, each of the adjoining parts storing the segment of the image frame data corresponding to a respective one of the selected regions of the image.

16. The computer system of claim 9, wherein said processing unit further comprise compressing means for compressing the segment of the image frame data retrieved from said video buffer prior to storage in said data storage device.

\* \* \* \* \*